No. 794,233. PATENTED JULY 11, 1905.
S. L. KISTLER.
SUPPOSITORIAL BOUGIE.
APPLICATION FILED MAR. 8, 1902.
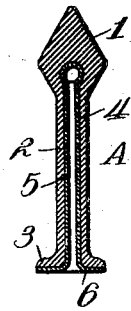

No. 794,233. Patented July 11, 1905.

UNITED STATES PATENT OFFICE.

SAMUEL L. KISTLER, OF LOS ANGELES, CALIFORNIA.

SUPPOSITORIAL BOUGIE.

SPECIFICATION forming part of Letters Patent No. 794,233, dated July 11, 1905.

Application filed March 8, 1902. Serial No. 97,340.

*To all whom it may concern:*

Be it known that I, SAMUEL L. KISTLER, a citizen of the United States, residing in Los Angeles, county of Los Angeles, State of California, have invented new and useful Improvements in Suppositorial Bougies, of which the following is a specification.

My invention relates to means for applying medicaments to the diseased surfaces of the human body, and especially to the rectal and uterine canals; and the object thereof is to produce a medicated bougie which by its shape will be self-retaining in the rectal canal or in the uterine canal until it is dissolved by the moisture exuded by the membranes with which it is in contact, and thereby apply medicament to those parts for a considerable period of time. I accomplish this object by the suppositorial bougie described herein and illustrated in the accompanying drawings, forming a part hereof, which discloses a longitudinal cross-sectional view of my invention.

In the treatment of hemorrhoids and other diseases of the rectal canal and also in the treatment of the uterine canal it is often desirable that medicament be applied to the diseased membranes or abscess for a considerable period of time. To accomplish this purpose, various devices have been used to inclose the medicament and hold it in proximity to the parts to be treated and to permit the exudation of a small quantity from the instrument containing the same to be applied to or absorbed by the mucous membranes. Some of these devices work very well, but do not apply the medicament equally to all portions of the membranes. With my improved bougie I am able to apply the medicament to every part of the membranes with which it is in contact and to extend the treatment over a considerable period of time.

I prefer to make my bougie of a medicament which will be slowly dissolved by the moisture exuded by the membranes in contact therewith when placed in the rectal or uterine canal. It is made of such medicaments as may be desired.

In the treatment of rectal diseases I have found a medicament made of gelatin, glycerin, cocoa-butter, hydrastinine, ichthyol, and orthoform to work very well. I dissolve a sufficient quantity of gelatin, which gives to the bougie stiffness and a slow resistance to the dissolvent action of the moisture exuded by the membranes, so it will last a considerable time, in cocoa-butter and glycerin by the action of heat. I then thoroughly mix in the other ingredients, the proportion of each depending upon the condition of the parts to be treated, then pour the mixture into molds. When cool, the bougie is taken from the molds and is ready for use.

In the drawing, A represents my improved bougie comprising a head 1, which is preferably pear-shaped, so that it may be easily inserted into the canal, the head also serving to retain the bougie in position after its insertion. Secured to this head and formed integrally therewith is a neck 2, the opposite end of which neck is provided with an enlarged base 3, adapted to prevent the bougie from passing entirely within the rectal or other canal or uterus. The base also serves as a closure to prevent the exudation of the dissolved portions of the bougie from the canal and retain the same in contact with the parts under treatment.

The bougie formed as above set forth is provided with a longitudinally-extending central bore 4, starting from the base, passing through the neck, and stopping at a point near the center of the head to receive a wire or other suitable instrument to aid in placing the bougie in the desired location. This bore 4 is provided with a hollow core 5, formed of a less readily soluble substance than is the body portion of the bougie itself.

The inner end of the hollow core may be enlarged, as shown, and the outer end flared over the end of the base of the bougie, as at 6, for the purpose of retaining the medicament when dissolved in opposition to the mucous membranes surrounding it. The core, if desired, may be made of a stiffer and less readily dissolved substance than the body. It may be made of soft rubber, if desired. The ends of the hollow core may be enlarged in order to hold the medicament surrounding said core longer in opposition with the mucous membranes surrounding it, thereby insuring a longer application of the medicament used.

For the treatment of rectal diseases the stem of the bougie is of such length that the head of the bougie is permitted to pass inside the inner sphincter muscle with the base thereof exterior the outer sphincter muscle. It will be observed that by this form of bougie, composed of medicaments and gelatin or of other substances, it may be kept in contact with the parts requiring treatment for a considerable period of time and that the medicament is thereby slowly dissolved and more thoroughly applied thereto than if contained in a perforated instrument or applied otherwise. The same advantages are obtained in the treatment therewith of the uterine canal.

Having described my invention, what I claim as new, and desire to secure by Letters Patent, is—

1. A suppositorial soluble bougie consisting of an outer soluble material and an inner less easily soluble material.

2. A suppositorial bougie comprising a soluble imperforate body portion and a less easily soluble flexible hollow core embedded and extending longitudinally within the soluble body portion, the core closed at its inner end and adapted to receive one end of a placing instrument.

3. A suppositorial bougie comprising a soluble flexible body portion and a less easily soluble hollow core around which the body portion is molded, the core being flared outwardly at the end at which it is inserted in the body portion for the purpose of retaining the soluble body portion in contact with the parts and to close the orifice in which the bougie is received.

In witness that I claim the foregoing I have hereunto subscribed my name this 28th day of February, 1902.

SAMUEL L. KISTLER.

Witnesses:
G. E. HARPHAM,
HENRY T. HAZARD.